United States Patent
Sud

(10) Patent No.: US 10,180,495 B2
(45) Date of Patent: Jan. 15, 2019

(54) SEPARATING WEAK AND STRONG MOVING TARGETS USING THE FRACTIONAL FOURIER TRANSFORM

(71) Applicant: The Aerospace Corporation, El Segundo, CA (US)

(72) Inventor: Seema Sud, Reston, VA (US)

(73) Assignee: The Aerospace Corporation, El Segundo, CA (US)

( * ) Notice: Subject to any disclaimer, the term of this patent is extended or adjusted under 35 U.S.C. 154(b) by 273 days.

(21) Appl. No.: 15/201,672

(22) Filed: Jul. 5, 2016

(65) Prior Publication Data
US 2018/0011182 A1    Jan. 11, 2018

(51) Int. Cl.
*G01S 13/90* (2006.01)
*G01S 7/02* (2006.01)

(52) U.S. Cl.
CPC .......... *G01S 13/9029* (2013.01); *G01S 7/023* (2013.01)

(58) Field of Classification Search
CPC .... G01S 13/583; G01S 13/60; G01S 13/9029; G01S 13/524; G01S 7/023; G06F 17/14
See application file for complete search history.

(56) References Cited

U.S. PATENT DOCUMENTS

| 6,636,174 B2 * | 10/2003 | Arikan | G01S 13/524 342/104 |
| 2002/0030623 A1 * | 3/2002 | Arikan | G01S 13/524 342/195 |

FOREIGN PATENT DOCUMENTS

FR    3018915 A1 *    9/2015    ............ G06F 17/14

OTHER PUBLICATIONS

O.A. Alkishriwo et al., "Signal Separation in the Wigner Distribution Domain Using Fractional Fourier Transform"; Proceedings of the 19th European Signal Processing Conference (EUSIPCO 2011); pp. 18979-1883; Copyright in the Year 2011. (Year: 2011).*
A. Bultheel et al., "Computation of the Fractional Fourier Transform," Int. Journal of Applied and Computational Harmonic Analysis 16, pp. 182-202 (2004).
C. Candan et al., "The Discrete Fractional Fourier Transform," IEEE Trans. on Sig. Proc., vol. 48, No. 5, pp. 1329-1337 (May 2000).
C. Candan et al., "The Discrete Fractional Fourier Transform," Proc Int. Conf. on Acoustics, Speech, and Sig. Proc. (ICASSP), Phoenix, AZ, pp. 1713-1716 (Mar. 15-19, 1999).
H. M. Ozaktas et al., "The Fractional Fourier Transform with Applications in Optics and Signal Processing," West Sussex, England, John Wiley and Sons, pp. 118-120 and 205 (2001).
H. Y. Guo et al., "Detection of Moving Target Based on Fractional Fourier Transform in SAR Clutter," Proc. IEEE Int. Conf. on Sig. Proc. (ICSP), Beijing, China, pp. 2003-2006 (Oct. 24-28, 2010).

(Continued)

*Primary Examiner* — Bernarr E Gregory
(74) *Attorney, Agent, or Firm* — LeonardPatel PC

(57) ABSTRACT

The Fractional Fourier Transform (FrFT) may be used to extract multiple radar targets in clutter where some targets may be relatively weak. To do this, stronger targets may be removed by rotating to the proper axis $t_a$ using rotational parameter a, in which the target signal becomes a strong tone. By searching for the maximum peak over all values of a, stronger moving target echoes can be found and notched out, and weaker targets can then be extracted.

25 Claims, 9 Drawing Sheets

(56) References Cited

OTHER PUBLICATIONS

Hao Liu et al., "Applying Fractional Fourier Transform to Radar Imaging of Moving Targets," Proc. IEEE Geoscience and Remote Sensing Symp. (IGARSS), Toulouse, France, pp. 4071-4073 (Jul. 21-25, 2003).

Hong-Bo Sun et al., "Application of the Fractional Fourier Transform to Moving Target Detection in Airborne SAR," IEEE Transactions on Aerospace and Electronic Systems, vol. 38, No. 4, pp. 1416-1424 (Oct. 2002).

Jian Wu et al., "Parameter Estimation for SAR Moving Target Detection Using Fractional Fourier Transform," IEEE Proc. IGARSS, Quebec City, QC, Canada, pp. 596-599 (Jul. 13-18, 2014).

John O'Toole et al., "A Discrete Time and Frequency Wigner-Ville Distribution: Properties and Implementation," Proc. Int. Symp. on Digital Sig. Proc. and Comm. Systems, Noosa Heads, Australia (Dec. 19-21, 2005).

M. A. Kutay et al., "Optimal Filtering in Fractional Fourier Domains," IEEE Trans. on Sig. Proc., vol. 45, No. 5, pp. 937-940 (May 1997).

M. Alper Kutay et al., "Optimal Filtering in Fractional Fourier Domains," IEEE Trans. on Sig. Proc, vol. 45, No. 5, pp. 1129-1143 (May 1997).

Qi Meng et al., "A New Method of Moving Targets Detection and Imaging for Bistatic SAR," Seventh International Symposium on Computational Intelligence and Design, pp. 224-227 (2014).

Xiaolong Chen et al., "Sea Clutter Suppression and Moving Target Detection Method Based on Clutter Map Cancellation in FRFT Domain," Proc. IEEE CIE Int. Conf. on Radar, Chengdu, China, pp. 438-441 (Oct. 24-27, 2011).

Yin Deqiang et al., "Weak Target Detection Based on Fractional Spectral Subtraction in Sea Clutter," Proc. IEEE Int. Conf. on Electric Inform. and Control Eng. (ICEICE), Beijing, China (Apr. 15-17, 2011).

* cited by examiner

RELATED ART

SEPARATING WEAK AND STRONG MOVING TARGETS USING THE FRACTIONAL FOURIER TRANSFORM

FIELD

The present invention generally pertains to signal processing, and more specifically, to separating weak and strong moving targets from composite echo signals using the Fractional Fourier Transform (FrFT).

BACKGROUND

The Fractional Fourier Transform (FrFT) has a wide range of applications in fields such as optics, quantum mechanics, image processing, data compression, and signal processing for communications. The FrFT of a function $f(x)$ of order a is defined as $$F^a[f(x)] = \int_{-\infty}^{\infty} B_a(x,x') f(x') dx' \quad (1)$$

where the kernel $B_a(x,x')$ is defined as $$B_a(x, x') = \frac{e^{i(\pi \hat{\phi}/4 - \phi/2)}}{|\sin(\phi)|^{1/2}} \times e^{i\pi(x^2 \cot(\phi) - 2xx' \csc(\phi) + x'^2 \cot(\phi))} \quad (2)$$

where $\phi = a\pi/2$ and $\hat{\phi} = \text{sgn}[\sin(\phi)]$. This applies to the range $0 < |\phi| < \pi$, or $0 < |a| < 2$. In discrete time, the $N \times 1$ FrFT of an $N \times 1$ vector can be modeled as $$X_a = F^a x \quad (3)$$

where $F^a$ is an $N \times N$ matrix whose elements are given by $$F^a[m, n] = \sum_{k=0, k \neq (N-1+(N)_2)}^{N} u_k[m] e^{-j\frac{\pi}{2}ka} u_k[n] \quad (4)$$

and where $u_k[m]$ and $u_k[n]$ are the eigenvectors of the matrix S defined by $$S = \begin{pmatrix} C_0 & 1 & 0 & \cdots & 1 \\ 1 & C_1 & 1 & \cdots & 0 \\ 0 & 1 & C_2 & \cdots & 0 \\ \vdots & \vdots & \vdots & \ddots & \vdots \\ 1 & 0 & 0 & \cdots & C_{N-1} \end{pmatrix} \quad (5)$$

and $$C_n = 2\cos\left(\frac{2\pi}{N}n\right) - 4 \quad (6)$$

In Eq. (6), N is the size of the matrix determined by the length of the vector x. The FrFT is a useful approach for separating a signal-of-interest (SOI) from interference and/or noise when the statistics of either are non-stationary (i.e., at least one device is moving, Doppler shift occurs, time-varying signals exist, there are drifting frequencies, etc.). The FrFT enables translation of the received signal to an axis in the time-frequency plane where the SOI and interference/noise are not separable in the frequency domain (as produced by a conventional Fast Fourier Transform (FFT)) or in the time domain The Wigner Distribution (WD) is a time-frequency representation of a signal. The WD may be viewed as a generalization of the Fourier Transform, which is solely the frequency representation. The WD of a signal $x(t)$ can be written as $$W_x(t,f) = \int_{-\infty}^{\infty} x(t+\tau/2) x^*(t-\tau/2) e^{-2\pi j \tau f} d\tau \quad (7)$$

The projection of the WD of a signal $x(t)$ onto an axis $t_a$ gives the energy of the signal in the FrFT domain a, $|X_a(t)|^2$. Letting $\alpha = a\pi/2$, this may be written as $$|X_\alpha(t)|^2 = \int_{-\infty}^{\infty} W_x(t\cos(\alpha) - f\sin(\alpha), t\sin(\alpha) + f\cos(\alpha)) df \quad (8)$$

In discrete time, the WD of a signal $x[n]$ can be written as $$W_x\left[\frac{n}{2f_s}, \frac{kf_s}{2N}\right] = e^{j\frac{\pi}{N}kn} \sum_{m=l_1}^{l_2} x[m] x^*[n-m] e^{j\frac{2\pi}{N}km} \quad (9)$$

where $l_1 = \max(0, n-(N-1))$ and $l_2 = \min(n, N-1)$. This particular implementation of the discrete WD is valid for non-periodic signals. Aliasing is avoided by oversampling the signal $x[n]$ using a sampling rate $f_s$ (samples per second) that is at least twice the Nyquist rate.

When applying the FrFT to perform interference suppression, the rotational parameter a should first be estimated. Radar echoes from moving targets are chirp signals, and the WD of a chirp signal $x(t)$ is shown in graph 100 of FIG. 1. Graph 100 illustrates how the FrFT may be used to detect chirp signals. By rotating to the axis $t_a$ and computing the energy in the FrFT, the chirp projects onto the axis as a strong tone, which can be detected and notched by finding the peak of the energy using Eq. (8). Lower power chirps, at other rotational axes, can then be detected by repeating the process.

The signal model discussed here follows that presented by Sun et al. See Sun et al., *Application of the Fractional Fourier Transform to Moving Target Detection in Airborne SAR*, IEEE Trans. on Aerosp. and Electr. Systems, Vol. 38, No. 4 (October 2002). Assume that there is an airborne radar platform, such as an aircraft moving along the y-axis at constant speed V and a moving target i at an initial distance $R_{0,i}$ at time $t=0$, moving with speed $v_i$ and acceleration $a_i$, potentially in a different direction than the plane. See, e.g., graph 200 of FIG. 2. After time t, the platform and target have moved a total distance of $V_t$ and $v_i t + \frac{1}{2} a_i t^2$, respectively. The components of the speed of the target along the x-axis and y-axis are $v_{r,i}$ and $v_{c,i}$, respectively. Similarly, the accelerations are $a_{r,i}$ and $a_{c,i}$, respectively, where c is the speed of light at approximately $3 \times 10^8$ m/s. At time t, target i is now at a distance from the platform whose horizontal component has decreased by $v_{r,i} t + \frac{1}{2} a_{r,i} t^2$. Likewise, the vertical component has decreased by $v_{c,i} t + \frac{1}{2} a_{c,i} t^2$. Accordingly, the distance between the target and radar can be approximated by $$R_i(t) \approx R_{0,i} - v_{r,i} t + [(V - v_{c,i})^2 - R_{0,i} a_{r,i}] \frac{t^2}{2R_{0,1}} \quad (10)$$

The echo of the moving target as received by the radar system can be approximated by a chirp signal that takes the form $$x_i(t) = e^{j 2\pi f_{d,i} t} e^{j\pi K_i t^2} \quad (11)$$

where $$f_{d,i} = \frac{2v_{r,i}}{\lambda} \quad (12)$$

$$K_i = \frac{2}{\lambda R_{0,i}}[-(V - v_{c,i})^2 + R_{0,i}a_{r,i}] \quad (13)$$

$\lambda$ is the wavelength of the radar, related to its frequency $f$ by $\lambda = c/f$. It is further assumed that there are no strong point scatterers so the ground (i.e., surface) clutter can be adequately modeled as additive white Gaussian noise (AWGN) using a desired Signal-to-Clutter Ratio (SCR). If a scenario with multiple moving targets (K total) is assumed, the composite received echo signal can be written as $$x(t) = \sum_{i=1}^{K} A_i x_i(t) + n(t) \quad (14)$$

where n(t) is a combination of clutter and noise using a given SCR and each amplitude $A_i$ is chosen to model strong and weak targets. If it is assumed, without loss of generality, that signal i=1 is the main target, the amplitudes $A_i$ for i=1, 2, . . . , K can be modeled using an assumed carrier-to-interference (CIR) by writing $A_i = 10^{-CIR_i/20}$.

The algorithm given by Sun et al. is based on the fact that a chirp signal in the FFT domain is spread out over a band of frequencies, whereas at the optimum rotational parameter a (see FIG. 1), the projection of the signal onto that axis, given by the magnitude squared of its FrFT, is maximized. This signal is therefore estimated by computing a peak and comparing it to the sidelobe level to determine a detection (i.e., peak-to-sidelobe ratios (PSRs)). The peak is then removed by applying a narrow, bandstop filter. Next, by rotating back to the time domain, the operation is performed again to find the second strongest signal, the third strongest, etc.

It should be noted that Sun et al. never found a tone. Rather, the peak was calculated at multiple values of a in the FrFT domain. The PSR was then computed and the value of a that gave the largest PSR was chosen.

Per the above, the FrFT can be applied to the problem of separating multiple moving targets of differing power levels received by a monostatic radar system in clutter, for instance, because moving target echoes are chirp signals, which can be separated in the FrFT domain. However, conventional processes, such as that presented in Sun et al., are relatively computationally intensive and not presently capable of performance in real time. Accordingly, an improved approach to separating weak and strong moving targets may be beneficial.

SUMMARY

Certain embodiments of the present invention may be implemented and provide solutions to the problems and needs in the art that have not yet been fully solved by conventional signal separation technologies. For example, some embodiments of the present invention use the FrFT to extract multiple radar targets in clutter where some targets may be relatively weak. To do this, stronger targets may be removed by rotating to the proper axis $t_a$ using rotational parameter a, in which the target signal becomes a strong tone. By searching for the maximum peak over all values of a, stronger moving target echoes can be found and notched out, and weaker targets can then be extracted. Alternatively, all targets but the strongest, or the second strongest, or the third strongest, etc. may be removed and that target could then be processed. The signal could be used to identify the nature of the aircraft or object that is detected and/or its range.

In one embodiment, a computer-implemented method includes determining, by a computing system, a rotational parameter $a_1$ of a strongest signal in a composite echo signal at which an energy of a WD is maximum for a given step size $\Delta a$ by computing a peak of a FrFT at all angles for the step size and choosing an angle that corresponds with the maximum energy such that the strongest signal is a tone when rotated to $a_1$. The computer-implemented method also includes outputting $a_1$, by the computing system.

In another embodiment, a computer program is embodied on a non-transitory computer-readable medium. The program is configured to cause at least one processor to (for 0<a<2 and i=1, where a is a rotational parameter in a WD for a composite echo signal x(t) and i is a current signal) compute a FrFT of x(t), compute a max value for the FrFT of x(t), and increment a by a step size $\Delta a$. The computer program is also configured to cause the at least one processor to find a peak over all a and rotate to the peak for signal i. The computer program is further configured to cause the at least one processor to notch out the peak and notch out signal i.

In yet another embodiment, an apparatus includes memory storing computer program instructions configured to separate targets from a signal and at least one processor configured to execute the computer program instructions. The at least one processor, by executing the computer program instructions, is configured to (for 0<a<2 and i=1, where a is a rotational parameter in a WD for a composite echo signal x(t) and i is a current signal) compute a FrFT of x(t), compute a max value for the FrFT of x(t), and increment a by a step size $\Delta a$. The at least one processor is also configured to find a peak over all a. While i≤K, where K is a total number of signals, the at least one processor is further configured to increment i such that i=i+1, rotate for signal i to $a_i$-$a_{i-1}$, notch out a peak at $a_i$-$a_{i-1}$, and notch out signal i.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which.

Figure 6:
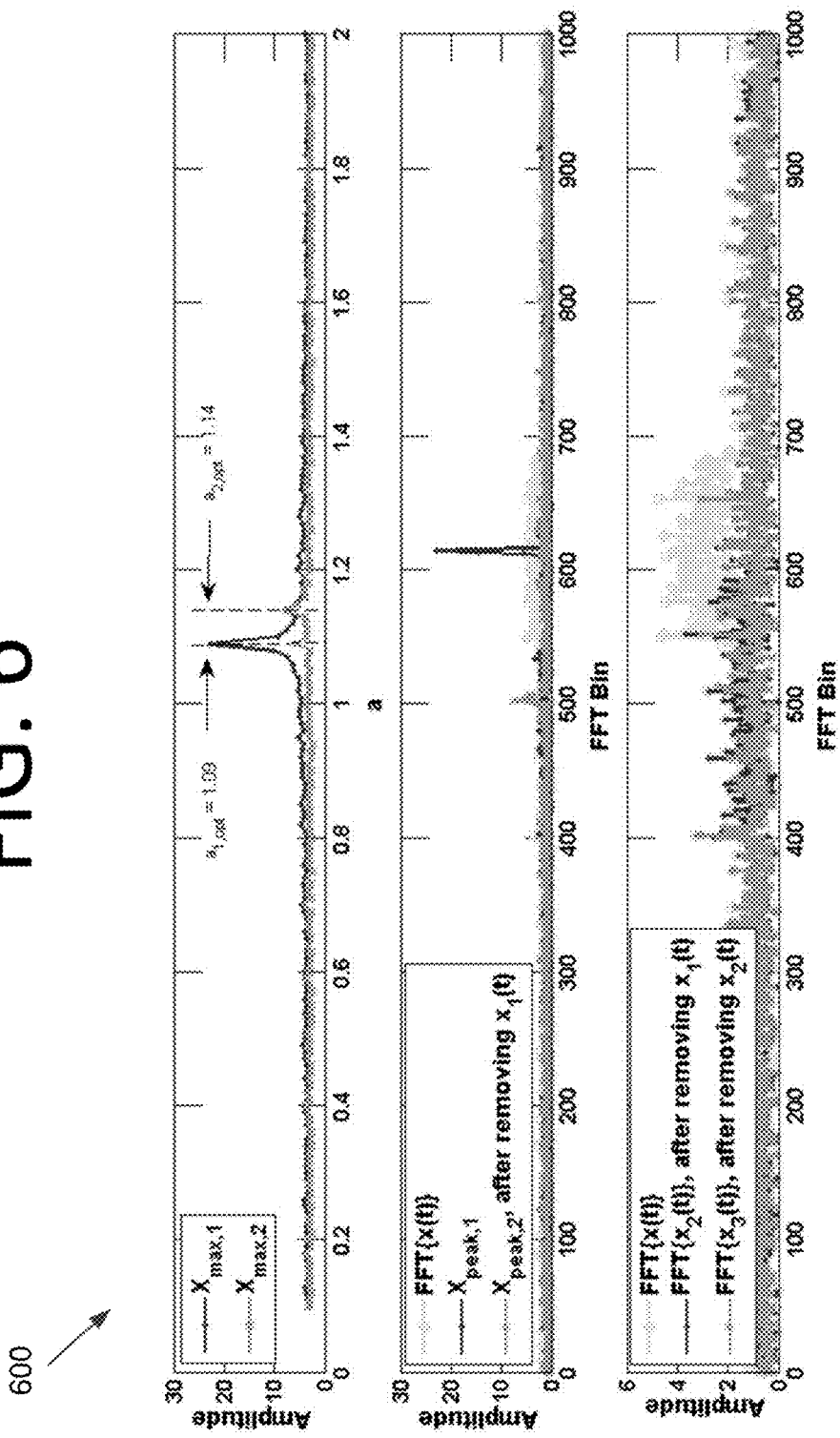

FIG. 6 illustrates graphs that show $X_{max,i}$, $X_{peak,i}$ and $FFT\{x_{i+1}(t)\}$ for a second example with only targets 1 and 2 present, SCR=0 dB, and $CIR_2$=8 dB, according to an embodiment of the present invention.

Figure 7:
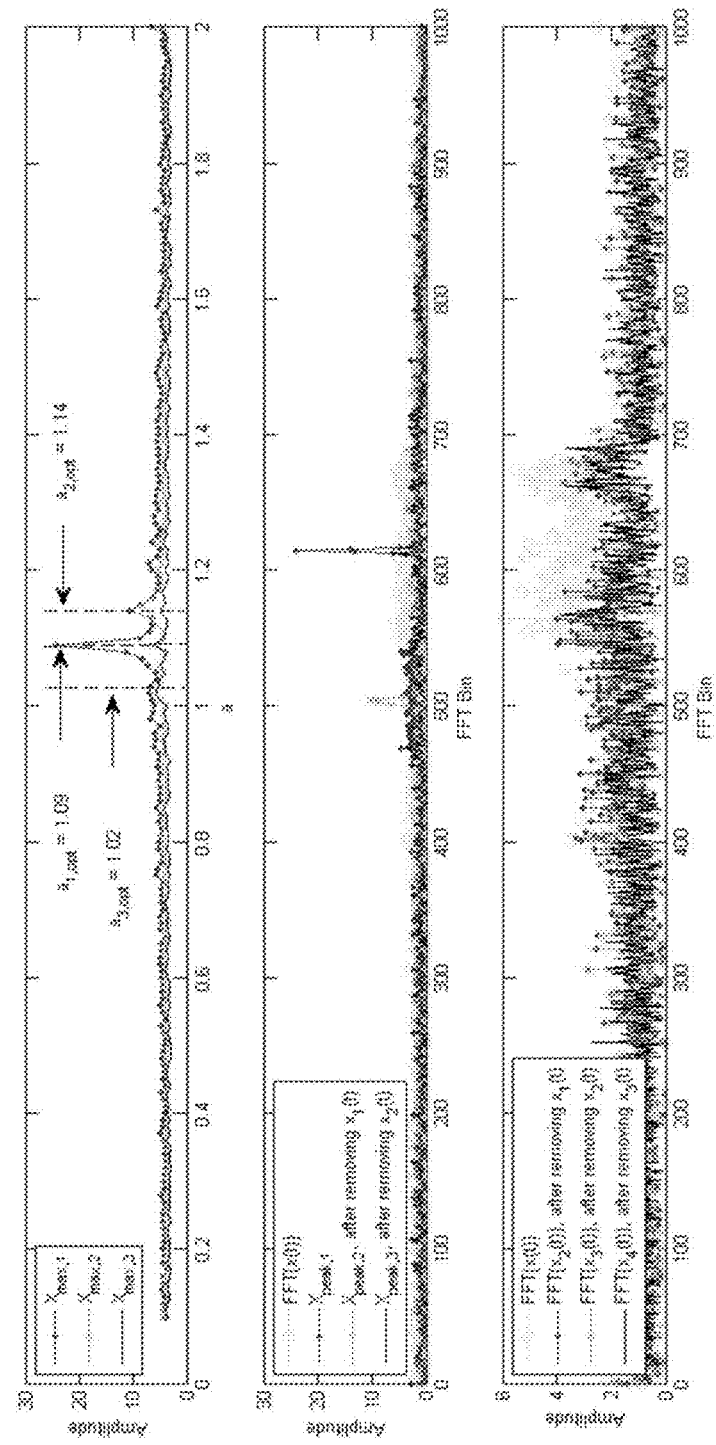

FIG. 7 illustrates graphs that show $X_{max,i}$, $X_{peak,i}$ and $FFT\{x_{i+1}(t)\}$ for a third example with three targets, SCR=0 dB, $CIR_2$=3 dB, and $CIR_3$=8 dB, according to an embodiment of the present invention.

Figure 8:
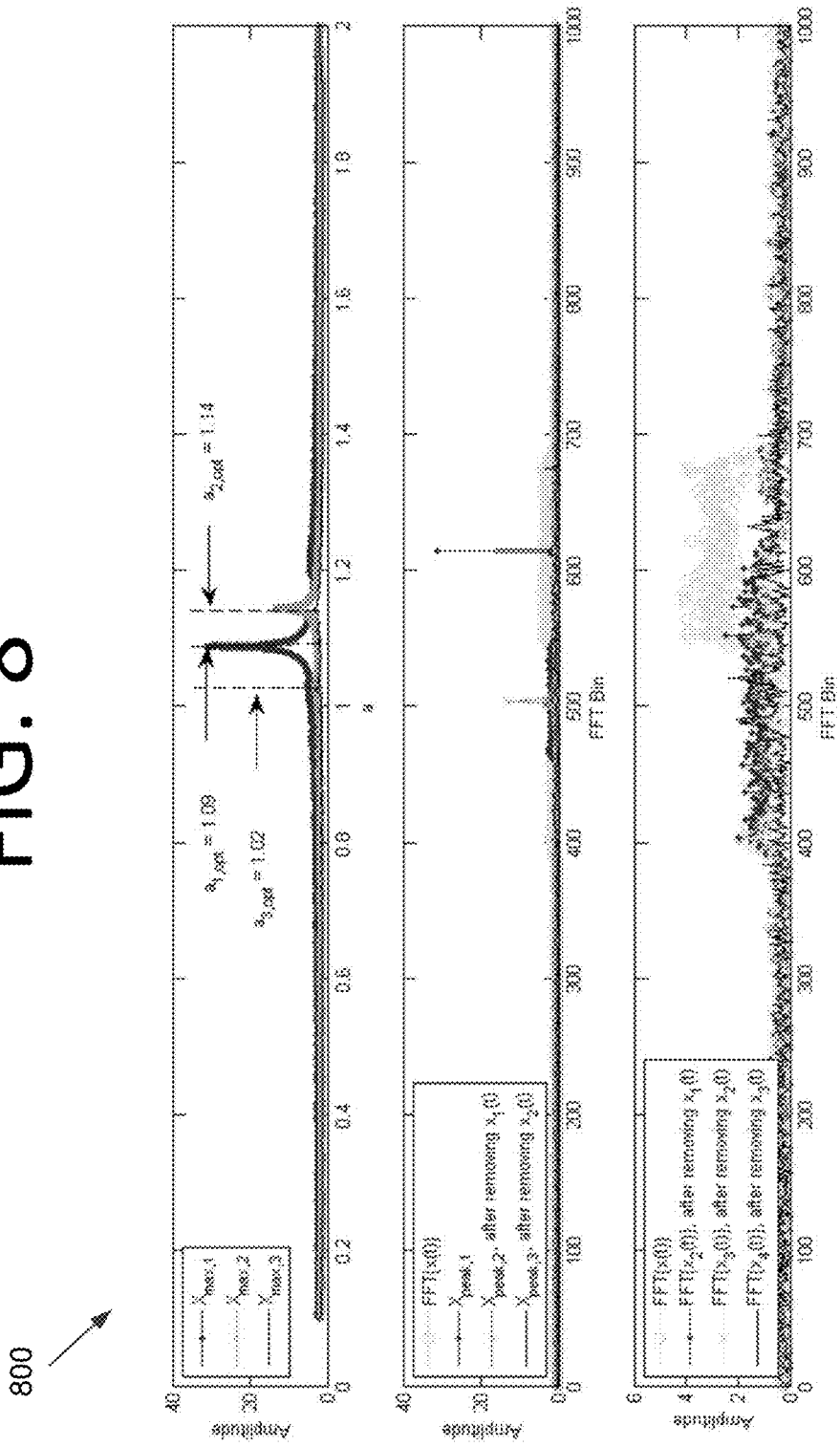

FIG. 8 illustrates graphs that show $X_{max,i}$, $X_{peak,i}$ and $FFT\{x_{i+1}(t)\}$ for a fourth example with three targets, SCR=10 dB, $CIR_2$=5 dB, and $CIR_3$=20 dB, according to an embodiment of the present invention.

Figure 9:
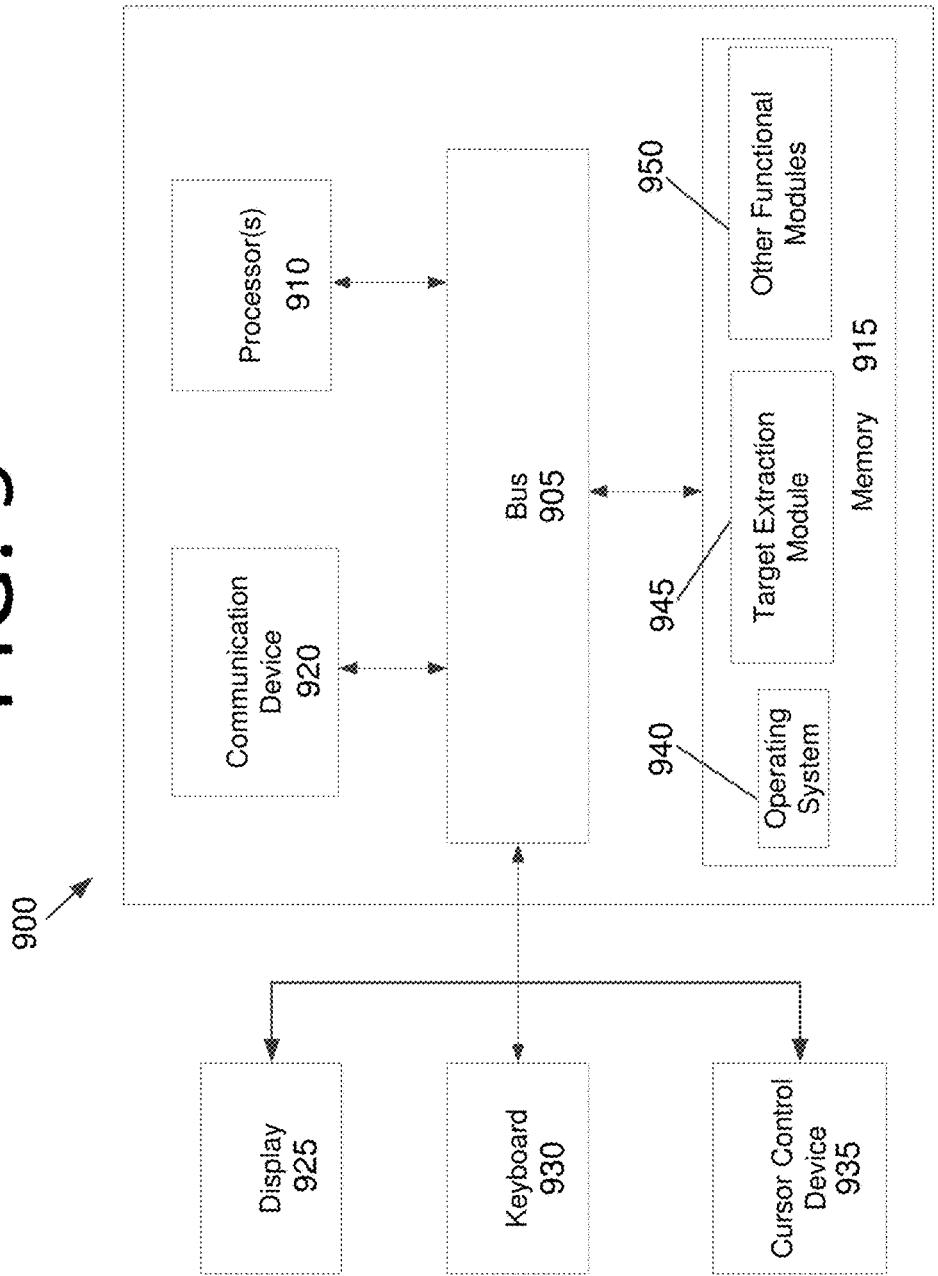

FIG. 9 is a block diagram illustrating a computing system configured to extract multiple targets from a signal, according to an embodiment of the present invention.

DETAILED DESCRIPTION OF THE EMBODIMENTS

Some embodiments of the present invention pertain to an algorithm for extracting multiple signals from clutter. Some embodiments differ from the approach presented in Sun et al. in at least four ways: (1) the rotational parameter of the strongest signal $a_1$ at which the energy of the WD is maximum is determined by computing the peak of the FrFT at all angles and choosing the maximum. This avoids sidelobe computation at each a, which is unnecessary in an environment of moving targets in noise and clutter; (2) once the value of $a_1$ is calculated, instead of computing a bandstop filter to remove the strong signal, the algorithm rotates to the axis $a_1$, in which the desired signal is now a tone, finds the peak along this new rotational axis, and sets the peak to zero, thereby notching out the target to search for subsequent lower power targets. This also significantly simplifies and increases the speed of the algorithm by avoiding the complexity of filtering; (3) instead of performing two rotations to look for the next strongest signal, i.e., first to $-a_1$ and then to $a_2$ (as in Sun et al.), the algorithm rotates to $a_2-a_1$, hence performing the next rotation in one step; and (4) the FrFT is only performed at all angles a once since signals can be notched out and the next peak can then be determined from $X_{max,i}$ without another search. In some embodiments, all targets but the strongest, or the second strongest, or the third strongest, etc. may be removed and that target could then be processed. The signal could be used to identify the nature of the aircraft or object that is detected and/or its range.

Embodiments may have various applications. For instance, some embodiments could be used by aircraft to identify other aircraft or Unmanned Aerial Vehicles (UAVs), and/or could be used by spacecraft to identify debris. Even a chirpy communication signal could be utilized since chirp interferers could be notched out. This could also be applied to the problem of air traffic control, and even to separation of targets at walking speed, which are much subtler and harder to detect (e.g., a slow moving vehicle, person, animal, or any other moving ground object).

Algorithm

The algorithm of some embodiments is summarized below. In this example, the step size for a, $\Delta a$ is 0.01 and N=1,000 samples of the composite echo signal x(t) is collected. However, any desired step size may be used and/or any desired number of samples may be collected without deviating from the scope of the invention. Note that once each signal is isolated, conventional signal processing can be performed to compute any desired parameters associated with the target.

---

Initialize: $a_{0,opt}$ = 0; i = 1;
1. For a = 0 : $\Delta a$ : 2; // Loop over all a
    X(a) = $F^a$x(t); // Compute FrFT of x(t) per Eq.(14)
    $X_{max,i}$(a) = max(|X(a)|) ; // Compute max value
  End
2. $a_{i,opt}$ = arg max$X_{max,i}$(a) ; // Find peak over all a
3. $X_{peak,i}$ = $F^{[a_{i,opt}-a_{i-1,opt}]}$x(t); // Rotate signal to i
4. $X_{max,i}$(a)$|_{a_{i,opt}}$ = 0; // Notch out peak i
5. $X_{peak,i}|_{max}$ = 0; // Notch out signal i
6. $x_{i+1}$(t) = $F^{-(a_{i,opt}-a_{i-1,opt})}X_{peak,i}$ // Rotate back to a = 0
7. Increment i = i + 1 and repeat Steps 2 - 5 for i = 2, 3, ... , K.
  (Step 6 is optional for plotting the intermediate time domain signal, and Steps 2-6 may be repeated in some embodiments)

---

Notching out the peak refers to notching where the current strongest target is in the space of all a (i.e., notching the peak in $X_{max,i}$). This enables subsequent search for weaker targets by finding the next a at which there is a peak after the strongest target is notched out. Notching out the signal means rotating the received signal to the value obtained from finding the peak in $X_{max,i}$ and notching the peak now in this received signal, which is called $X_{peak,i}$ herein. This notches the target signal itself in frequency. $X_{max,i}$ is a function of a, whereas $X_{peak,i}$ is a function of frequency in the rotated domain.

Figure 1:
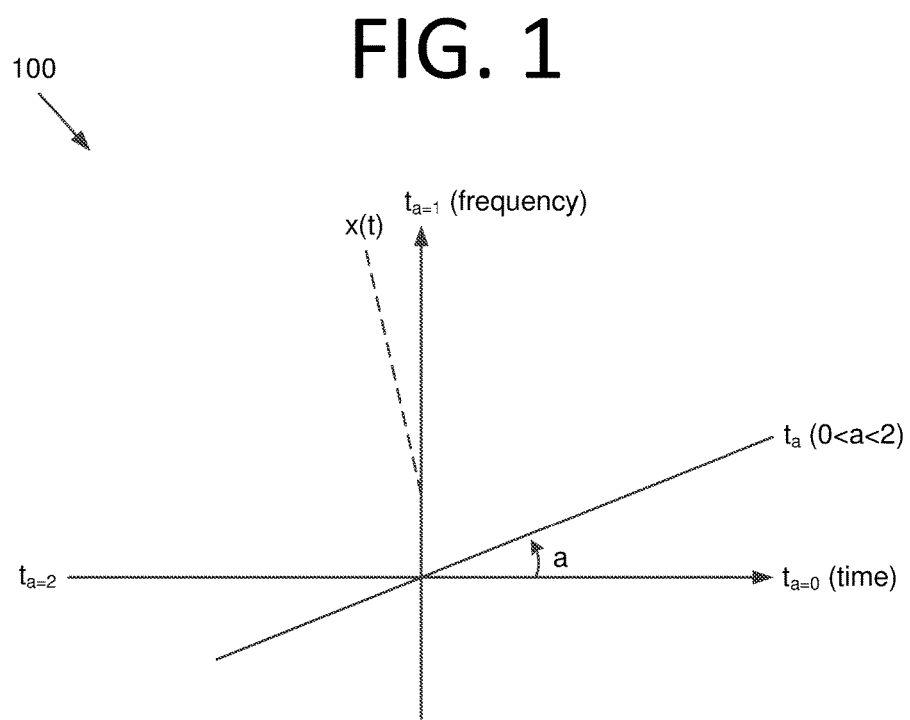
FIG. 1 is a Wigner Distribution (WD) of a chirp signal x(t).
Figure 2:
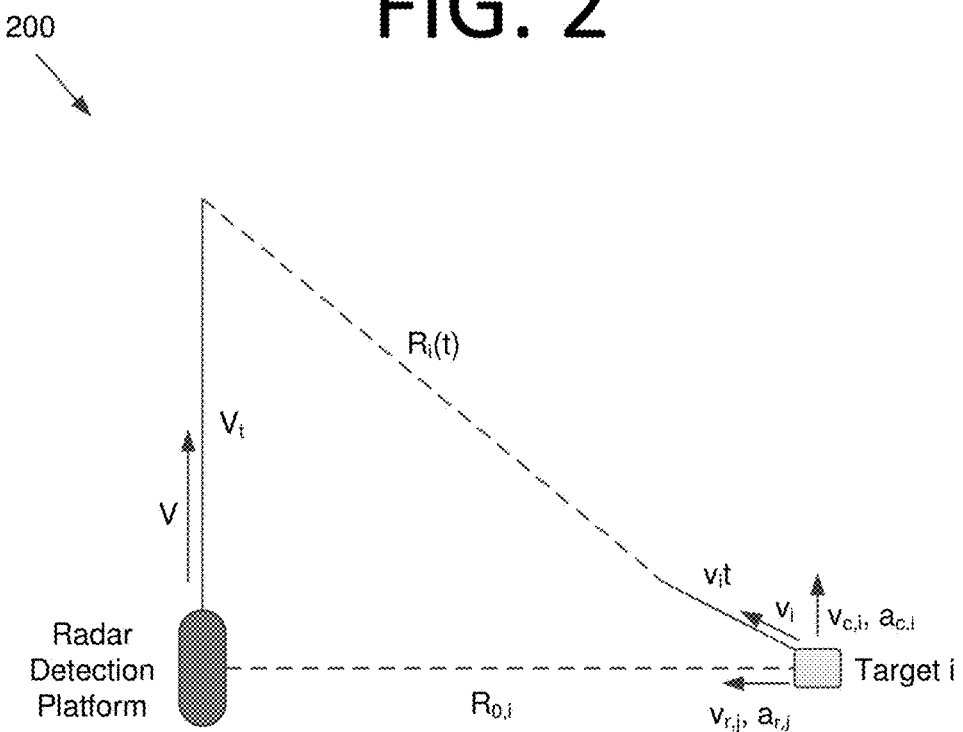
FIG. 2 is a graph illustrating a radar detection platform and moving target scenario.
Figure 3:
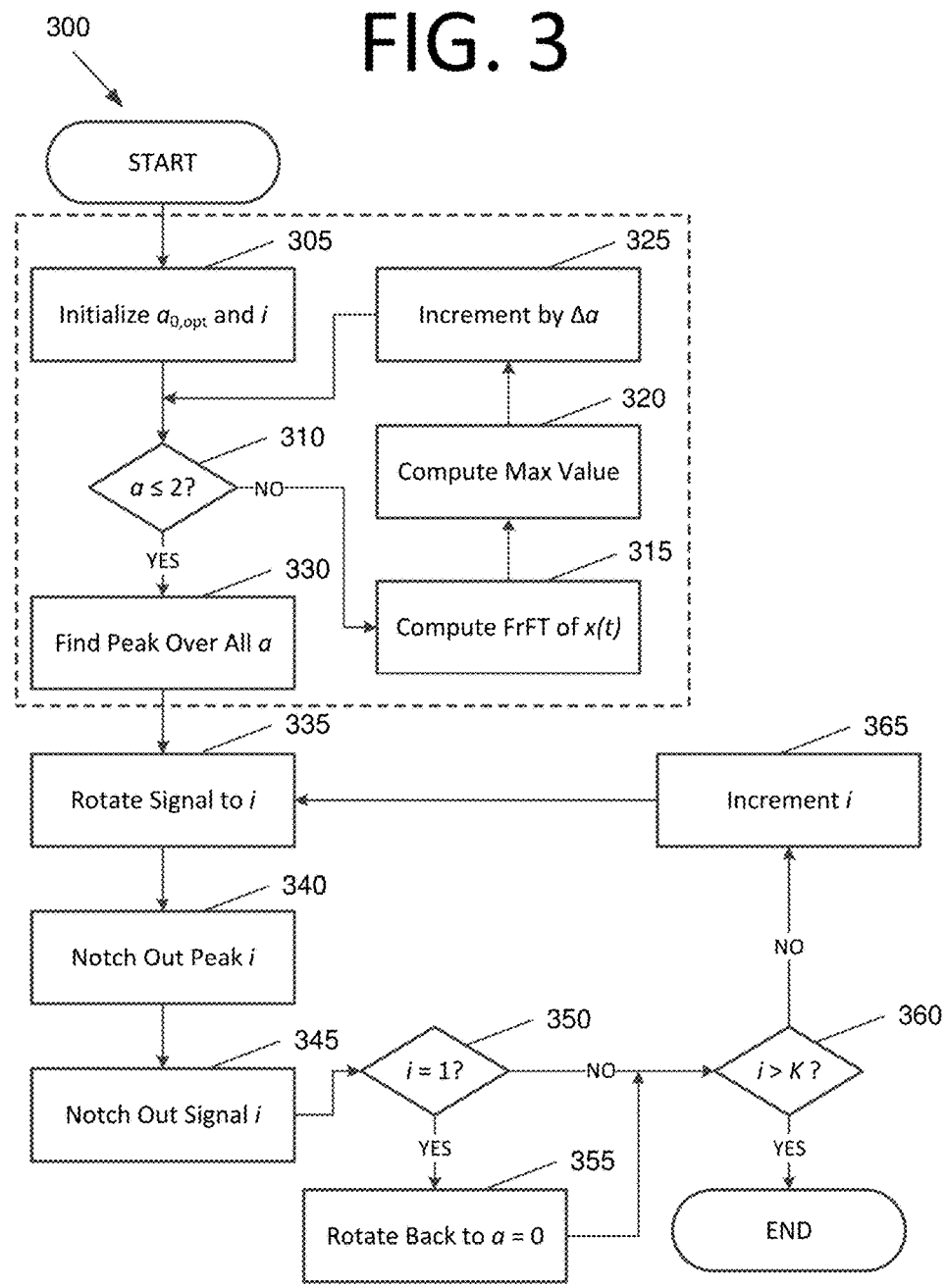
FIG. 3 is a flowchart illustrating a process for extracting multiple signals from clutter, according to an embodiment of the present invention.

FIG. 3 is a flowchart 300 illustrating a process for extracting multiple signals from clutter, according to an embodiment of the present invention. The process begins with initializing $a_{0,opt}$ to 0 and initializing i to 1 at 305. If a is not greater than 2 at 310, the FrFT of a composite echo signal x(t) is computed at 315 and the max value is computed at 320 in accordance with Step 1 above. a is then incremented by $\Delta a$ at 325, where $\Delta a$ is the step size. For instance, if $\Delta a$=0.01, after the first loop a=0.01, after the 12$^{th}$ loop a=0.12, etc. Because a=2 is equivalent to a=0, the computation is only performed at 0 and not at 2 in this embodiment. However, in other embodiments, the calculation may be performed at a=2 rather than a=0, or redundantly at both a=0 and a=2.

If a is greater than or equal to 2 at 310, the peak is found over all a at 330 in accordance with Step 2 above. The box with the dashed lines highlights that this portion of the algorithm is only performed once in this embodiment. Since this is the most computationally intensive portion of the algorithm, embodiments of the present invention may realize significant speed and computational efficiency improvements over conventional approaches. This is a significant improvement over conventional approaches. For instance, Sun et al. finds $a_1$, rotates back to 0, finds $a_2$, rotates back to 0, finds $a_3$, etc. In other words, Sun et al. repeats the search, which is the most expensive operation, having a complexity of SN log N that increases with step size, where S is the number of steps based on the step size and N is the number of samples. For instance, for a step size of 0.01 where S=200 (i.e., a=0, 0.01, . . . , 1.99) and N=1,000, the complexity would be 200×1,000 log 1,000, or 200,000 log 1,000. Sun et al. did not appear to know how to get a tone, which is exemplified by processing power levels, side lobe levels, filtering, etc. This is significantly more suboptimal than embodiments of the present invention.

Figure 4:
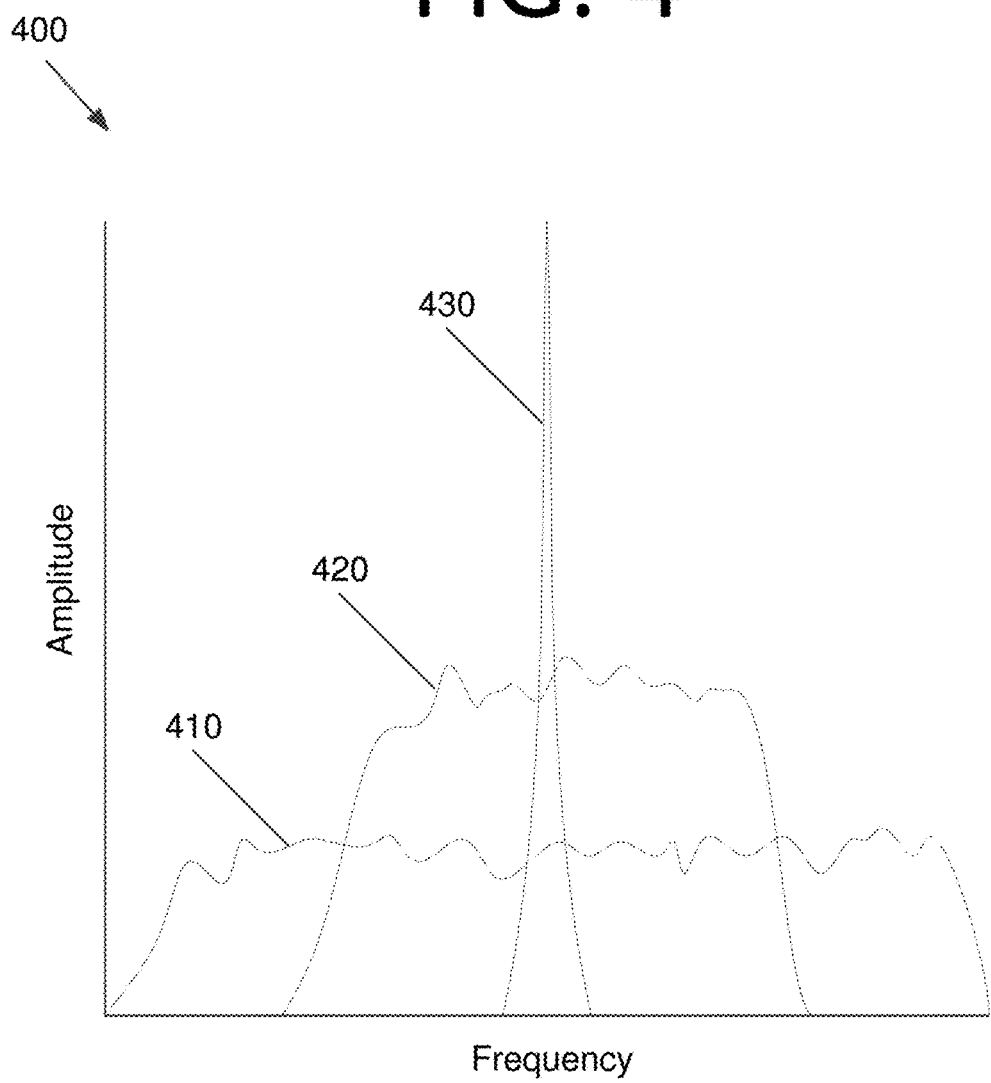
FIG. 4 is a graph illustrating how a chirp "squishes" into a tone signal as rotation closer to the maximum occurs, according to an embodiment of the present invention.

Rotating the signal, in essence, "squishes" the chirp to a tone in accordance with the conservation of energy. This principle is demonstrated in graph 400 of FIG. 4, with arbitrary units of frequency on the x-axis and arbitrary units of amplitude on the y-axis. At a certain value of a, the signal has lower amplitude pattern 410. As further rotation towards the maximum occurs, the amplitude increases and the signal starts to shorten horizontally to an intermediate amplitude pattern 420. Once the maximum is found, the signal presents itself as a tone in maximum amplitude pattern 430.

Returning to FIG. 3, the algorithm rotates the signal to i at 335 in accordance with Step 3. Peak i is notched out at 340 in accordance with Step 4 and signal i is notched out at 345 in accordance with Step 5. If i=1 at 350, the algorithm rotates back to a=0 at 355 in accordance with Step 6. However, 350 and 355 are optional for plotting the intermediate time domain signal and are not performed in certain embodiments.

Per the above, K is the number of moving targets in the signal. If i is greater than K at 360, the process ends. Otherwise, i is incremented by 1 at 365 and the process returns to 335 using the incremented i in accordance with Step 7.

Simulations

The three targets given in Sun et al., whose parameters are repeated for convenience in Table 1 below, are modeled herein.

TABLE 1

PARAMETERS OF SIMULATED TARGETS

| Target i | $v_{r,i}$ [m/s] | $v_{c,i}$ [m/s] | $a_{r,i}$ [m/s$^2$] |
|---|---|---|---|
| 1 | 0.67 | 5 | 2.54 |
| 2 | 1.67 | −5 | 3.97 |
| 3 | 2.33 | 3 | 1.03 |

Figure 5:
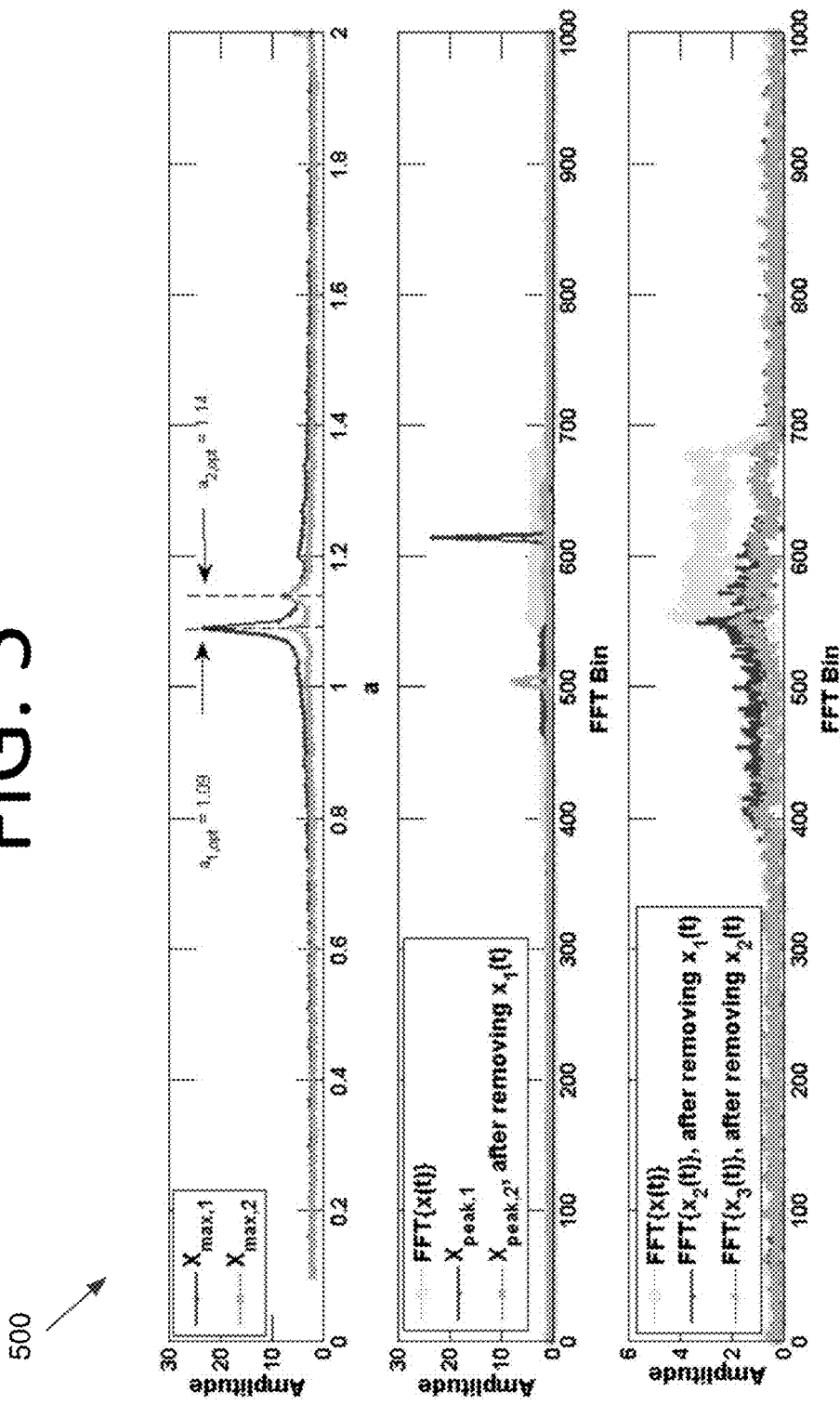
FIG. 5 illustrates graphs that show $X_{max,i}$, $X_{peak,i}$, and $FFT\{x_{i+1}(t)\}$ for a first example with only targets 1 and 2 present, SCR=10 dB, and $CIR_2$=6 dB, according to an embodiment of the present invention.

In the first example, it is assumed that only targets 1 and 2 are present, with SCR=10 dB, and CIR$_2$=6 dB. The results are shown in graph 500 of FIG. 5, where $X_{max,i}$, $X_{peak,i}$, and FFT$\{x_{i+1}(t)\}$ from Steps 1, 3, and 6 are plotted. Note the good detection and signal removal performance. It should also be noted that a target whose optimum detection parameter is a will still project energy onto an axis a±Δe, where here, Δe≅0.01–0.02. This is called "signal leakage" herein. This means that only signals that are separated by 0.025 in a can be resolved. Note that the step size in Sun et al. is not provided. A larger step size could be a cause of the need for a more complex algorithm. To reduce Δe requires a smaller Δa, with an associated processing cost in Step 1 of the algorithm discussed above.

The second example in graphs 600 of FIG. 6 shows two targets where now the SCR has been reduced to 0 dB and CIR$_2$ has been increased to 8 dB. The detection algorithm continues to perform well. Note from the top graph in FIG. 6 that notching out $x_1(t)$ still results in a small peak about $a_{1,opt}$ (from the signal leakage and noise). As CIR$_2$ continues to increase (i.e., signal $x_2(t)$ continues to get weaker compared to $x_1(t)$), it may not be possible to accurately estimate its rotational parameter because the small peak near $a_{1,opt}$ may dominate. If such a condition is expected to occur, Δa can be reduced or the algorithm can be modified to null one or two samples about the peak at $a_{1,opt}$ to avoid the problem. The algorithm would then correctly select $a_{2,opt}$.

In the third example, the third target is added using SCR=0 dB, CIR$_2$=3 dB, and CIR$_3$=8 dB. The result is given in graphs 700 of FIG. 7, detection is still achieved, and the bottom graph shows that performance of the algorithm notching out successive signals is as good as before, even for a third signal.

In the fourth example, SCR=10 dB, CIR$_2$=5 dB, and CIR$_3$=20 dB. In this case, the simulation shows that using Δa=0.01 is not sufficient to accurately estimate $a_{3,opt}$. Thus, Δa is set to 0.0001 with good results, as shown in graphs 800 of FIG. 8. Note from the bottom graph that because the signal is already so weak, notching out the signal does not change the spectrum much, as is expected. From this example, it can be seen that to detect weak signals, a smaller Δa can be used. There is a limit, however, since if the signal becomes too weak, it cannot be estimated in the clutter of the noise floor no matter how small Δa is. Signals that are 20 dB below the strongest signal and 10 dB below the clutter are about the weakest that can be detected and notched by the algorithm in some embodiments. That is, if CIR$_3$ goes higher 20 dB or SCR goes lower than 10 dB in some embodiments, the algorithm may start to have errors in finding $a_{3,opt}$, and hence detecting and notching the third signal. This can be seen in FIG. 8 as the peak in the black curve in the first plot is just barely above the floor, and it would be obscured by higher clutter levels or if the signal were weaker.

The same approach discussed above can be applied to near equal or even equal power users. For example, if CIR2=0.25 dB and CIR3=0.5 dB (i.e., users 2 and 3 are now only 0.25 and 0.5 dB, respectively, below the strongest user, user 1), the approach works just as well. Peaks in the spectrum are still obtained (i.e., $X_{max,i}$), but the peaks will now be closer in power. This would be expected because the signals are closer in power, but the peaks can be extracted nonetheless.

This approach works for equal or near equal power users because the targets are separable in the FrFT domain. Thus, even if the targets are equal or near equal in power, finding peaks in the FrFT domain over the range of a, from 0≤a<2, and then rotating to each FrFT domain where a peak occurred in turn will enable notching of one signal to search for subsequent signals. With past approaches, i.e., non-FrFT based approaches, equal or near equal power signals could not be separated because they overlap in time and frequency.

The approach described herein also works when users are equal power because peaks are still obtained in the FrFT spectrum, which can be notched in turn. Slight power differences occur naturally due to clutter, etc., allowing the same algorithm to find the targets.

In summary, the algorithm need not change for equal power or near equal power users. This is because the powers of the incoming targets are allowed to change and become more stressing than before. Thus, both weak interferers interfering with strong interferers and strong interferers interfering with one another may be separated.

FIG. 9 is a block diagram illustrating a computing system 900 configured to extract multiple targets from a signal, according to an embodiment of the present invention. System 900 includes a bus 905 or other communication mechanism for communicating information, and processor(s) 910 coupled to bus 905 for processing information. Processor(s) 910 may be any type of general or specific purpose processor, including a central processing unit ("CPU") or application specific integrated circuit ("ASIC"). Processor(s) 910 may also have multiple processing cores, and at least some of the cores may be configured for specific functions. System 900 further includes a memory 915 for storing information and instructions to be executed by processor(s) 910. Memory 915 can be comprised of any combination of random access memory ("RAM"), read only memory ("ROM"), flash memory, cache, static storage such as a magnetic or optical disk, or any other types of non-transitory computer-readable media or combinations thereof. Additionally, system 900 includes a communication device 920, such as a transceiver, to wirelessly provide access to a communications network. Communication device 920 may receive the signal including the targets.

Non-transitory computer-readable media may be any available media that can be accessed by processor(s) 910 and may include both volatile and non-volatile media, removable and non-removable media, and communication media. Communication media may include computer-readable instructions, data structures, program modules or other data in a modulated data signal such as a carrier wave or other transport mechanism and includes any information delivery media.

Processor(s) 910 are further coupled via bus 905 to a display 925, such as a Liquid Crystal Display ("LCD"), for displaying information to a user. A keyboard 930 and a cursor control device 935, such as a computer mouse, are further coupled to bus 905 to enable a user to interface with system 900. However, in certain embodiments such as those for mobile computing implementations, a physical keyboard and mouse may not be present, and the user may interact with the device solely through display 925 and/or a touchpad (not shown). Any type and combination of input devices may be used without deviating from the scope of the invention. Furthermore, in certain embodiments, such input devices are not present at all.

Memory 915 stores software modules that provide functionality when executed by processor(s) 910. The modules include an operating system 940 for system 900. The modules further include a target extraction module 945 that is configured to extract multiple moving targets from a signal. System 900 may include one or more additional functional modules 950 that include additional functionality.

One skilled in the art will appreciate that a "system" could be embodied as a personal computer, a server, a console, a personal digital assistant ("PDA"), a cell phone, a tablet computing device, or any other suitable computing device, or combination of devices. Presenting the above-described functions as being performed by a "system" is not intended to limit the scope of the present invention in any way, but is intended to provide one example of many embodiments of the present invention. Indeed, methods, systems and apparatuses disclosed herein may be implemented in localized and distributed forms consistent with computing technology, including cloud computing systems.

It should be noted that some of the system features described in this specification have been presented as modules, in order to more particularly emphasize their implementation independence. For example, a module may be implemented as a hardware circuit comprising custom very large scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Further, modules may be stored on a computer-readable medium, which may be, for instance, a hard disk drive, flash device, RAM, tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

A robust algorithm extracts both strong and weak targets in a moving target environment with clutter in some embodiments. The algorithm may apply the FrFT. Since target echoes are chirp signals, when rotated to the fractional domain a that maximizes the energy in the FrFT (i.e., their projection onto the axis $t_a$ in the WD), they become tones. Tones from stronger signals may be notched out, and the resultant signal may be rotated again to notch out the next strongest signal. Hence, weak signals in clutter can be extracted. The algorithm in some embodiments works in finding and notching targets that are up to 20 dB below the strongest target and up to 10 dB below the clutter. If clutter power is the same as signal power, targets that are 8 dB weaker can still be extracted.

The process steps performed in FIG. 3 may be performed by a computer program, encoding instructions for the nonlinear adaptive processor to perform at least the process described in FIG. 3, in accordance with embodiments of the present invention. The computer program may be embodied on a non-transitory computer-readable medium. The computer-readable medium may be, but is not limited to, a hard disk drive, a flash device, a random access memory, a tape, or any other such medium used to store data. The computer program may include encoded instructions for controlling the nonlinear adaptive processor to implement the process described in FIG. 3, which may also be stored on the computer-readable medium.

The computer program can be implemented in hardware, software, or a hybrid implementation. The computer program can be composed of modules that are in operative communication with one another, and which are designed to pass information or instructions to display. The computer program can be configured to operate on a general purpose computer, or an ASIC.

It will be readily understood that the components of various embodiments of the present invention, as generally described and illustrated in the figures herein, may be arranged and designed in a wide variety of different configurations. Thus, the detailed description of the embodiments of the systems, apparatuses, methods, and computer programs of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A computer-implemented method, comprising:
  determining, by a computing system, a rotational parameter $a_1$ of a strongest signal in a composite echo signal at which an energy of a Wigner Distribution (WD) is maximum for a given step size $\Delta a$ by computing a peak of a Fractional Fourier Transform (FrFT) at all angles for the step size and choosing an angle that corresponds with the maximum energy such that the strongest signal is a tone when rotated to $a_1$;
  after calculating $a_1$, rotating by $a_1$ to an axis of the signal in which the strongest signal is now a tone, by the computing system;
  finding a peak along the axis, by the computing system; and
  setting the peak to zero, by the computing system, producing a notched composite echo signal with the strongest signal notched out.

2. The computer-implemented method of claim 1, further comprising:
  rotating back to $\alpha=0$, by the computing system; and
  plotting an intermediate time domain signal, by the computing system.

3. The computer-implemented method of claim 1, further comprising:
  for a next strongest signal $a_2$, rotating, by the computing system, to $a_2-a_1$, hence performing a next rotation in one step.

4. The computer-implemented method of claim 3, further comprising:
  finding a new strongest peak along an axis of $a_2-a_1$, by the computing system; and
  setting the new strongest peak to zero, by the computing system, thereby notching out the next strongest signal from the composite echo signal to search for subsequent lower power targets.

5. The computer-implemented method of claim 4, wherein successive signals are found by:
  rotating, by the computing system, to an axis for an $i^{th}$ strongest signal of K total signals, where i=3, by rotating to $a_i-a_{i-1}$; and
  finding an $i^{th}$ peak along the axis of $a_i-a_{i-1}$, by the computing system.

6. The computer-implemented method of claim 5, further comprising:
  setting the $i^{th}$ peak to zero, by the computing system;
  incrementing i, by the computing system; and
  repeating the process until the $K^{th}$ signal is processed.

7. The computer-implemented method of claim 1, wherein the FrFT is only performed at all angles a for step size $\Delta a$ once for the composite echo signal since signals can be notched out from the composite echo signal and a next peak can then be determined without another search.

8. The computer-implemented method of claim 1, wherein $0.0001 \leq \Delta a \leq 0.01$.

9. The computer-implemented method of claim 1, wherein 1,000 or fewer samples N of the composite echo signal are collected.

10. The computer-implemented method of claim 1, wherein a Carrier-to-Interference Ratio (CIR) of a weakest signal is between 8-20 decibels lower than the strongest signal and a Signal-to-Clutter Ratio (SCR) of the weakest signal is 5-10 decibels below clutter.

11. A computer program embodied on a non-transitory computer-readable medium, the program configured to cause at least one processor to:
  for 0<a<2 and i=1, where a is a rotational parameter in a Wigner Distribution (WD) for a composite echo signal x(t) and i is a current signal:
    compute a Fractional Fourier Transform (FrFT) of x(t),
    compute a max value for the FrFT of x(t), and
    increment a by a step size $\Delta a$;
  find a peak over all a;
  rotate to the peak for signal i;
  notch out the peak; and
  notch out signal i, producing a notched composite echo signal.

12. The computer program of claim 11, wherein the program is further configured to cause the at least one processor to:
  rotate back to a=0; and
  plot an intermediate time domain signal.

13. The computer program of claim 11, wherein the program is further configured to cause the at least one processor to:
  while i≤K, where K is a total number of signals:
    increment i such that i=i+1;
    rotate for signal i to $a_i-a_{i-1}$;
    notch out a peak at $a_i-a_{i-1}$; and
    notch out signal i.

14. The computer program of claim 11, wherein the FrFT is only performed at all angles a for step size $\Delta a$ once for a given x(t) since signals can be notched out from x(t) and a next peak can then be determined without another search.

15. The computer program of claim 11, wherein $0.0001 \le \Delta a \le 0.01$.

16. The computer program of claim 11, wherein 1,000 or fewer samples N of x(t) are collected.

17. The computer program of claim 11, wherein a Carrier-to-Interference Ratio (CIR) of a weakest signal is between 8-20 decibels lower than a strongest signal.

18. The computer program of claim 11, wherein a Signal-to-Clutter Ratio (SCR) of a weakest signal is 5-10 decibels below clutter.

19. An apparatus, comprising:
memory storing computer program instructions configured to separate targets from a signal; and
at least one processor configured to execute the computer program instructions, wherein the at least one processor, by executing the computer program instructions, is configured to:
for 0<a<2 and i=1, where a is a rotational parameter in a Wigner Distribution (WD) for a composite echo signal x(t) and i is a current signal:
compute a Fractional Fourier Transform (FrFT) of x(t),
compute a max value for the FrFT of x(t), and increment a by a step size $\Delta a$,
find a peak over all a,
while i≤K, where K is a total number of signals:
increment i such that i=i+1,
rotate for signal i to $a_i - a_{i-1}$,
notch out a peak at $a_i - a_{i-1}$, and
notch out signal i, wherein
a notched composite echo signal is produced that does not include the K notched out signals.

20. The apparatus of claim 19, wherein the at least one processor is further configured to:
rotate back to a=0 after processing for signal i=1; and
plot an intermediate time domain signal.

21. The apparatus of claim 19, wherein the FrFT is only performed at all angles a for step size $\Delta a$ once for a given x(t) since signals can be notched out from x(t) and a next peak can then be determined without another search.

22. The apparatus of claim 19, wherein $0.0001 \le \Delta a \le 0.01$.

23. The apparatus of claim 19, wherein 1,000 or fewer samples N of x(t) are collected.

24. The apparatus of claim 19, wherein a Carrier-to-Interference Ratio (CIR) of a weakest signal is between 8-20 decibels lower than a strongest signal.

25. The apparatus of claim 19, wherein a Signal-to-Clutter Ratio (SCR) of a weakest signal is 5-10 decibels below clutter.

* * * * *